United States Patent [19]

Wuepper et al.

[11] Patent Number: 5,023,987
[45] Date of Patent: Jun. 18, 1991

[54] STRATO STREAK FLUSH PATCH

[75] Inventors: Karl J. Wuepper; Jerald L. Swanson; Dale E. Hartz, all of King County, Wash.

[73] Assignee: The Boeing Company, Seattle, Wash.

[21] Appl. No.: 530,432

[22] Filed: May 30, 1990

Related U.S. Application Data

[63] Continuation of Ser. No. 401,556, Aug. 28, 1989, abandoned, which is a continuation of Ser. No. 206,566, Jun. 14, 1988, abandoned.

[51] Int. Cl.$^5$ ............................................. B23P 6/00
[52] U.S. Cl. ........................... 29/402.11; 29/402.12; 29/402.14; 52/514; 156/98
[58] Field of Search .......... 29/402.09, 402.11, 402.12, 29/402.13, 402.14, 402.15, 402.16, 402.17, 525.1, 525.2; 114/227, 228, 229; 264/36; 52/514; 156/94, 98

[56] References Cited

U.S. PATENT DOCUMENTS

| | | |
|---|---|---|
| 1,113,030 | 10/1914 | McLaurin . |
| 1,550,144 | 8/1925 | Blumberg ............................ 114/229 |
| 2,137,737 | 11/1938 | Wenzel . |
| 2,186,641 | 1/1940 | Jones . |
| 2,412,972 | 12/1946 | Dean ................................ 29/402.13 |
| 2,498,693 | 2/1950 | Mascolo . |
| 2,568,233 | 9/1951 | Hamilton . |
| 2,692,425 | 10/1954 | Martin ............................... 29/402.12 |
| 2,979,800 | 4/1961 | Wilbur et al. . |
| 3,044,920 | 7/1962 | Dewar . |
| 3,772,114 | 11/1973 | Kowalchuk . |
| 4,086,113 | 4/1978 | Cataffo et al. . |
| 4,181,547 | 1/1980 | Speer . |
| 4,432,547 | 2/1984 | Richards . |
| 4,471,594 | 9/1984 | Doyle . |
| 4,517,038 | 5/1985 | Miller ........................... 29/402.11 X |
| 4,588,626 | 5/1986 | Cologna et al. ...................... 428/63 |
| 4,620,407 | 11/1986 | Schmid ........................ 29/402.09 X |
| 4,732,633 | 3/1988 | Pokorny ....................... 29/402.09 X |
| 4,775,561 | 10/1988 | Barnett ............................. 264/36 X |

FOREIGN PATENT DOCUMENTS 2401506 7/1975 Fed. Rep. of Germany .
320413 11/1971 U.S.S.R. .

OTHER PUBLICATIONS

Divisional Application of U.S. Pat. No. 4,820,564 Issued on Apr. 11, 1989 and is a Divisional of U.S. Pat. No. 4,588,626.

Primary Examiner—Joseph M. Gorski
Attorney, Agent, or Firm—Seed and Berry

[57] ABSTRACT

A method and apparatus for repairing composite skin structures from a blind side. The method includes using an elongated patch with a compression jig to hold the patch in place while the patch is either bonded in place or fixed in place with countersunk fasteners or both. The patch, when used on composite materials, is constructed and positioned so as to have the same anisotropic load-carrying characteristics as does the material to be repaired. A blind side repair can be completely made in the field without requiring extensive facilities.

10 Claims, 2 Drawing Sheets

STRATO STREAK FLUSH PATCH

CROSS-REFERENCE TO RELATED APPLICATION

This application is a continuation of U.S. application Ser. No. 07/401,556, filed Aug. 28, 1989, now abandoned, which was a continuation of U.S. Ser. No. 07/206,566, filed June 14, 1988, now abandoned.

TECHNICAL FIELD

The invention relates to methods and apparatus for forming blind patches in composite structures.

BACKGROUND OF THE ART

The external panels and/or flight control surfaces of in ground support aircraft and military aircraft are exposed to various types of damage ranging from impact to ballistic type damage. This damage can result in stress concentration fractures, which, if not repaired, will propagate and grow with use. Typical prior art methods of repairing such damaged areas in aircraft having metal skin include the step of positioning a metal patch on the exterior of the damaged area so as to overlay the damaged area and overlap the aircraft skin. The patch is then attached to the skin with fasteners and caulked to prevent leakage. This method is described in U.S. Pat. No. 4,517,038, to Miller.

It is desirable to use a patch made from the same material as the aircraft skin. Thus, a metal patch is used for a metal-skinned aircraft and a composite patch should be used for a composite-skinned aircraft. However, metallic and composite materials have different physical properties which result in loads being transferred through the materials and patches differently. Metal is isotropic and transfers loads in all directions with equal facility. Composite structures, however, are typically designed to be anisotropic and thus distribute loads well in the direction of the embedded fibrous reinforcing material while transferring loads in other directions less effectively. Therefore, it is extremely important when patching composite materials that the patch be capable of transferring both compressive and tensile loads across the damaged area in a manner so as to cooperate with the isotropic properties of the material to be patched.

In addition to the above, it is highly desirable for both aerodynamic efficiency and the reduction of radar cross section (RCS) that the patch be flush with the adjacent sheet of material. The metallic airplane patch disclosed in Miller is not flush. In addition, a truly flush patch is desirable because the junction between the patch and the material is not affected as much as a nonflush patch by aerodynamic loading. This aerodynamic loading can cause the bond between the patch and the material to loosen such that water and other external elements could enter the junction therebetween to the detriment of the bond.

Difficulty has been encountered in providing a blind-side flush patch in which access to the damaged area is only available from the outside. Such a repair is very difficult in the field because the aircraft component (e.g., the wing section) cannot be disassembled for access to the interior of the wing. Therefore, a need exists for a field repair method and apparatus for forming a structural blind patch in a sheet of composite material.

SUMMARY OF THE INVENTION

It is therefore an object of the present invention to provide a field repair method for forming a structural bind patch in a sheet of composite material having a known thickness.

It is also an object of the present invention to provide a method and apparatus for forming a blind patch which will transfer tensile and compressive loads in an anisotropic material.

It is yet another object of the present invention to provide a bind patch which has a low radar cross section and upon which aerodynamic loading has minimal effect.

It is yet another object of the above invention to achieve the above objects with a method and apparatus which can be easily performed and operated in the field without disassembling portions of an aircraft to be repaired.

The invention achieves these and other objects and advantages which will become apparent from the description which follows by providing a flush patch having a major axis and a minor axis of substantially different dimensions, a filler portion having a thickness equal to the thickness of the material to be patched, a grasping member extending from the filler portion, and a circumferential backing lip extending from the perimeter of the filler portion so as to form a circumferential shoulder therewith.

In the preferred embodiment, the damaged area of the aircraft is trimmed to the same shape as the filler portion. The minor axis of the flush patch is inserted through the major axis and the trimmed-out damaged area so that the damaged area is flushly filled and the filler portion is closely received by the trimmed area.

The damaged area is first trimmed with the aid of a trimming and drilling template having an inner trim guide of the same shape as the filler portion. After the damaged area has been traced and routed out and the patch inserted, the template is replaced around the trimmed out area and a compression jig is used to grasp the grasping member and hold the backing lip of the patch firmly behind the material adjacent to the trimmed-out area. The jig also positively positions the template around the trimmed-out area so that drilling guides in the template can be used to drill coaxial holes through the perimeter of the trimmed-out area and the backing lip. A bonding material is preferably positioned between the backing lip and the material, and the edge of the routed area and the filler portion, so that a weathertight seal is formed. Blind side fasteners are then positioned through the holes and tightened to firmly attach the blind side patch to the material to be repaired. Tensile loads are transferred from one side of the material to the other through the fasteners and the patch while compressive loads are therefore transferred from one side of the material to the other through the filler portion of the patch.

In a composite structure aircraft, the patch itself and the bonding material are cured under elevated temperature and pressure through use of a vacuum bag and heating blanket.

BEST MODE FOR CARRYING OUT THE INVENTION

Figure 1:
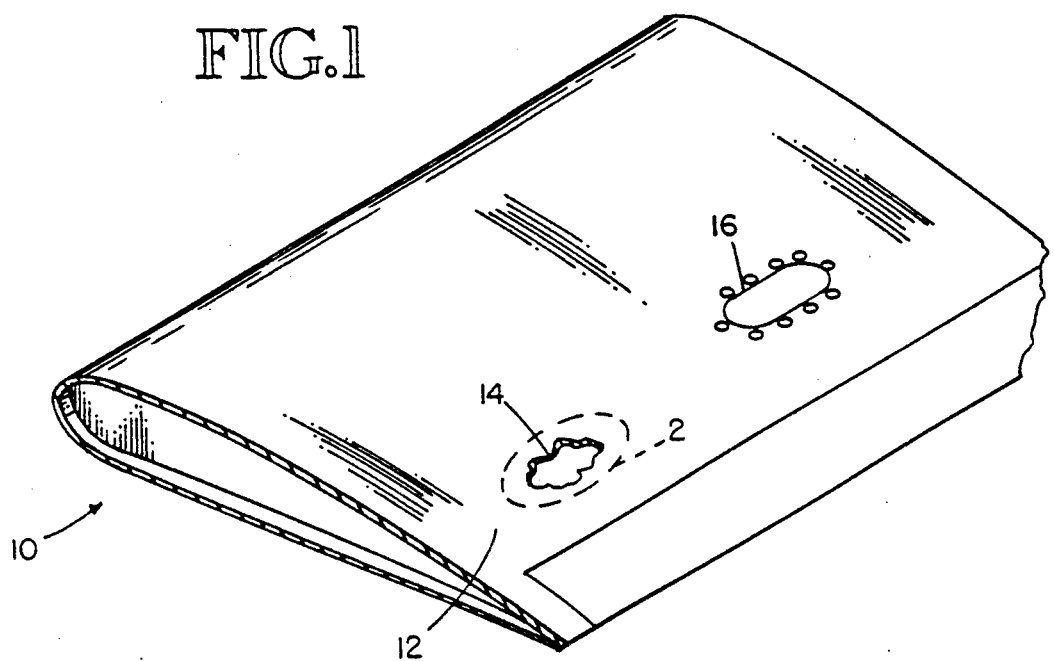
FIG. 1 is an isometric view of a wing section showing a damaged area and an area patched by the method and apparatus of the present invention.

An aircraft wing having a skin manufactured from a composite material, such as carbon fibers aligned in predetermined directions and an epoxy resin binder, is generally indicated at reference numeral 10 in FIG. 1. The aircraft skin 12 is shown with a damaged area 14 and an area 16 which has been patched by the method and apparatus of the present invention.

Structures made of composite material (or thermoplastic materials) are easily susceptible to damage, such as the ballistic damage shown at reference numeral 14. Repair of these materials usually requires a controlled environment, a long cure time for bonding procedures, and complicated repair procedures. The inventive method and apparatus permit repair of external aircraft structures such as that shown in FIG. 1 from a blind side (access from one side only) without the complications usually associated with such repairs. The repair shown at reference numeral 16 is of a true flush-type, providing aerodynamic smoothness of the outer boundary layer airflow. The repair also does not substantially change the radar cross section of the repaired area. The repair procedure is admirably suited to use in the field.

Figure 2:
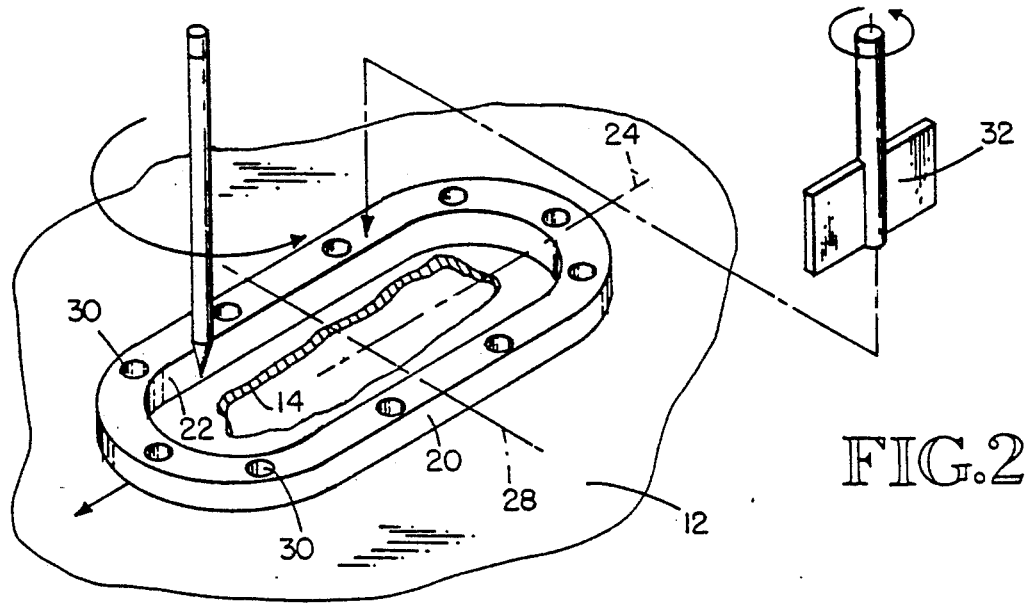
FIG. 2 is an enlarged isometric view of circled area 2 in FIG. 1 showing tracing and trimming steps of the present method.

As shown in FIG. 2, a template 20 is positioned over the damaged area 14. The template has an interior tracing guide 22 having a major, or longitudinal, axis 24 larger than its minor, or transverse, axis 28. The template also has a plurality of guide bores 30 for drilling coaxial holes through the aircraft skin 12 and the blind patch, as will be described more fully below.

After the damaged area 14 has been traced out, as shown in FIG. 2, the template 20 is temporarily removed and the damaged area 14 trimmed out by suitable means, such as by the use of a router 32.

After the damaged area has been trimmed out, a blind patch, generally indicated at reference numeral 40, is positioned through the trimmed-out area 42. The blind patch is preferably unitary and is made from the same composite material as is the aircraft skin 12. In particular, the blind patch 40 is preferably formed with a fabric reinforcement, such as carbon fiber, which has the same fiber direction and ply lay-up as the aircraft skin 12, such that the anisotropic load-bearing properties of the patch correspond to the anisotropic load-bearing properties of the aircraft skin.

The blind patch 40 has a body portion 44 and a filler portion 46 attached to the body portion 44. The filler portion 46 has the same shape as the interior tracing guide 22 and the same thickness as the aircraft skin 12. The body portion 44 has a radially extending, circumferential backing lip 48 extending beyond the perimeter of the filler portion 46 a distance approximately equal to four times the diameter of fasteners which will be more fully described below.

Figure 3:
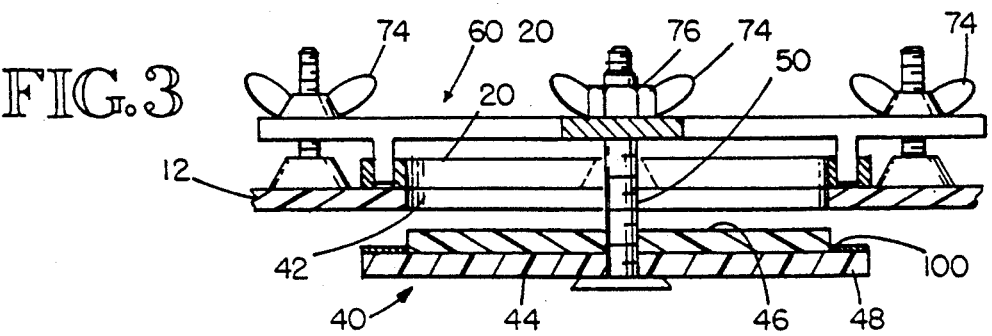
FIG. 3 is a cross-sectional view of the blind patch of the present invention in use with a template and compression jig of the present invention.

The blind patch 40 also has a nylon bolt 50 which extends upwardly from the body portion 44 of the patch through the filler portion 46 to provide a grasping member for the blind patch 40. The blind patch 40 is inserted into the trimmed-out area 42 by holding the bolt 50 and aligning the major axis of the blind patch 40 with the minor axis 24 of the trimmed-out area and inserting the minor axis of the blind patch through the major axis of the trimmed-out area. After the blind patch 40 has been inserted through this opening, the patch is aligned, as shown in FIG. 3, so that the filler portion 46 is closely received by the trimmed-out area 42, and so that the backing lip 48 abuts the aircraft skin 12, as shown in FIGS. 4, 5 and 6.

The blind patch 40 and template 20 are maintained in the position shown in the figures by a compression jig, generally indicated at reference numeral 60. The compression jig 60 has two cross-arms 62 and 64, each having threaded bores formed at its ends through which threaded legs 66 extend. The lower ends of the legs 66 terminate in respective feet 70. Respective wing nuts 74 are fixed to the upper ends of the threaded legs 66 so as to rotate therewith. Thus, rotation of the wing nuts 74 in a clockwise direction causes the feet 70 to extend downwardly. The cross-arms 62 and 64 also have a central bore (not threaded) which allows passage of the nylon bolt 50 therethrough. A hex nut 76 (separate from the wing nut 74 therebehind) threadably engages the nylon bolt 50 so as to draw the bolt and the blind patch 40 towards the cross-arms, while the feet 70 tend to urge the cross-arms 62 and 64 away from the aircraft skin 12. These counteracting forces compress and hold the blind patch 40 in the position shown in FIG. 4. Template guide pins 68, extending downwardly from the cross-arms 62 and 64, are provided to positively position the template 20 with respect to the blind patch 40 and aircraft 12.

Figure 4:
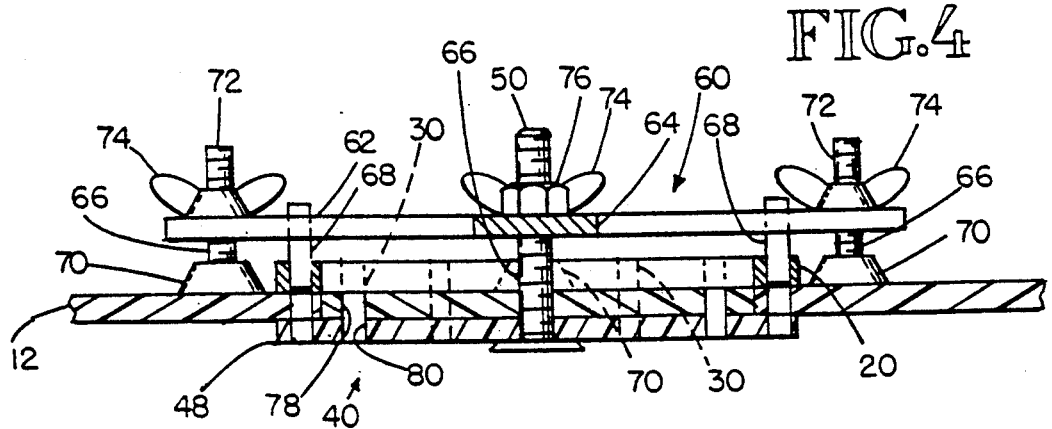
FIG. 4 is a view similar to FIG. 3 showing the jig compressing the blind patch against the material to be repaired and the template having been used as a drilling guide.

As shown in FIG. 4, the guide bores 30 in the template 20 are used to guide a drill bit (not shown) to drill coaxial holes 78, 80 (see FIG. 4) in the aircraft skin 12 and circumferential backing lip 48. With the jig in place, blind side fasteners, such as Composi-lok II ® blind side fasteners, manufactured by Monogram Aerospace Fasteners, a Nortec Company, Los Angeles, Calif., can be used. The backing lip 48 preferably has a radial dimension which is four times the diameter of the fastener.

Figure 5:
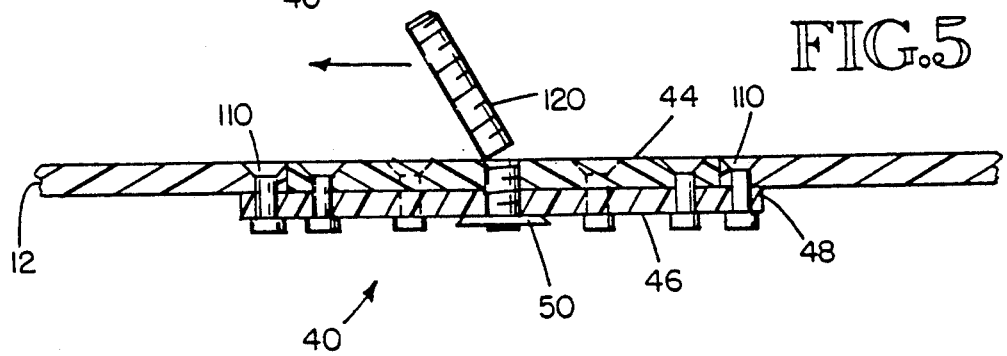
FIG. 5 is a view similar to FIG. 4 showing a grasping member of the blind patch being sheared off so that the patch is flushed to the sheet of material.
Figure 6:
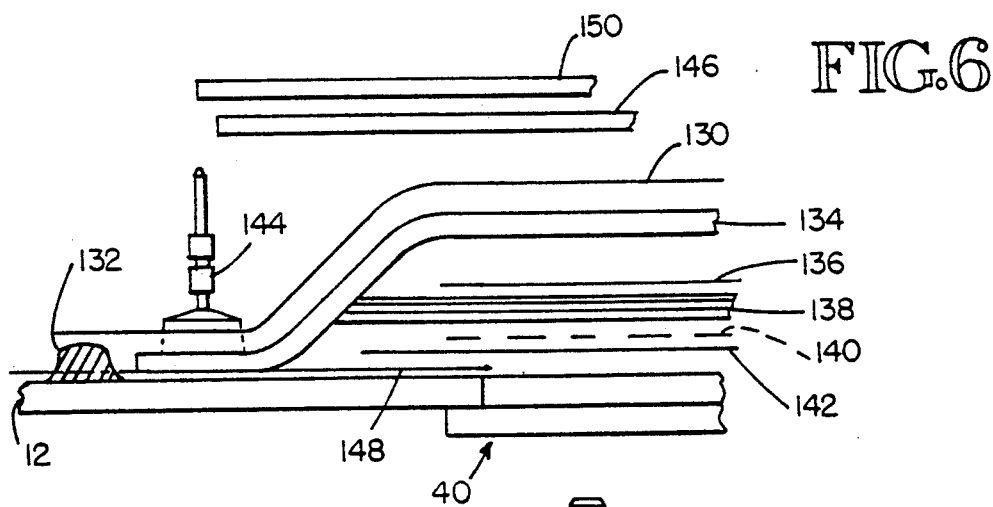
FIG. 6 is a diagrammatic, partial elevational view of a curing step of the present method.

The template 20 can now be removed, as shown in FIG. 4 (the template guide pin 68 can be made vertically movable), prior to the fasteners being installed, as shown in FIG. 5. If desired, a binding agent, such as an adhesive film 100 (as shown in FIG. 3), can be applied to a shoulder formed between the circumferential backing lip 48 and the perimeter of the filler portion 46 to make the seal weathertight.

The fasteners 110 are preferably countersunk so that the outer surface of the blind patch 40 is flush with the skin 12 of the aircraft. The fasteners shown at the positions of the guide pins 68 are provided by first removing the guide pins 68 from the position as shown in FIG. 4 and inserting them in holes 78 and 80, already bored in different locations, so that the drill bit may access these areas previously occupied by the guide pins.

In a subsequent step, shown in FIG. 5, an upper portion of the nylon bolt 50 is sheared off at the level of the aircraft 12 so as to be flush with the outer surface of the patch 40.

In a further step, shown in FIG. 6, the patch 40 and any adhesive film 100 applied thereto are fully cured in the field. A vacuum bag 130 is positioned over the blind patch 40. The vacuum bag 130 is sealed to the aircraft skin 12 by a peripheral run of vacuum sealing tape 132. Beneath the vacuum bag 130 are positioned, in descending order: breather plies 134, a nonperforated release film 136, bleeder plies 138, a release film 140, and a peel ply 142. All of the above plies and films are well known to those of skill in the composite material art. A vacuum probe 144 is positioned so as to penetrate the vacuum bag 130 and apply a vacuum pressure of approximately 20 inches of mercury to the patched area. A heating blanket 146 is positioned on top of the vacuum bag 130 to heat the blind patch 40 and adjacent area to a temperature of approximately 350° F. for a preferred period of approximately 2 hours. The temperature of the repaired area is measured by a thermocouple 148 which penetrates the vacuum sealing tape 132 so as to be adjacent to the repaired area. An insulating blanket 150 is also preferably positioned above the heating blanket 146 to minimize heat loss to the environment.

Figure 7:
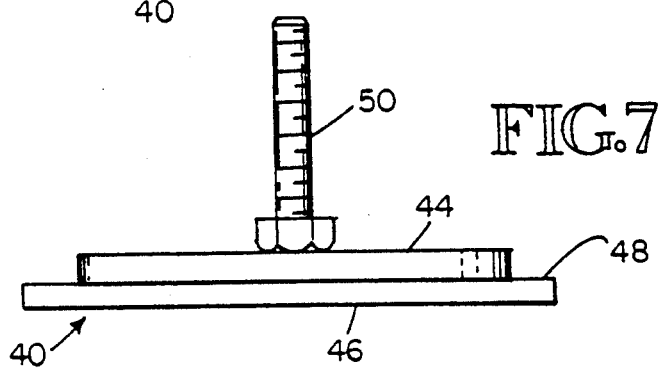
FIG. 7 is an elevational view of an alternate embodiment of the patch shown in FIGS. 3 through 5.

The resulting blind patch 40, as shown in FIG. 1 at reference numeral 16, is a true flush patch which closely models the anisotropic load-bearing properties of the surrounding aircraft skin 12. The patch can be easily applied in the field using the method described above without having to disassemble the wing to get at the blind side. Those of ordinary skill in the art will readily appreciate other modifications and variations of the invention described above. For example, as shown in FIG. 7, a nylon bolt 50 may be positioned on the exterior surface of the filler portion 48 and broken off in the step shown in FIG. 5 rather than sheared off. The invention, therefore, is not to be limited by the above description but is to be determined in scope by the claims which follow.

What is claimed is:

1. A field repair method for forming a structural blind patch in a sheet of anisotropic load-bearing material having a known thickness, comprising the steps of:
   providing an anisotropic flush patch having a major axis and a minor axis of substantially different dimensions, a filler portion having a thickness equal to the thickness of the material to be patched, and a circumferential backing lip extending from the perimeter of the filler portion so as to form a circumferential shoulder therewith;
   providing a grasping member extending from the filler portion;
   trimming a damaged area of the material to be patched to the same shape as that of the filler portion, thereby providing a trimmed area having a major axis and a minor axis;
   aligning the major axis of the flush patch with the minor axis of the trimmed area;
   inserting the minor axis of the flush patch through the major axis of the trimmed area, thereby inserting the patch through the trimmed area;
   aligning the filler portion with the trimmed area after the flush patch has been inserted so that the trimmed area is flushly filled by the filler portion, and so that the circumferential shoulder is closely received by the trimmed area, and so that the backing lip abuts the material adjacent to the trimmed area;
   fixing the backing lip to the material while holding the flush patch in place with the grasping member; and
   removing the grasping member, whereby compressive loads are transferred across the trimmed area through the filler portion and tensile loads are transferred across the trimmed area through the backing lip.

2. The method of claim 1 wherein the sheet of material is a fully cured composite of reinforcing fibers oriented in preselected directions and a binding resin, and wherein the flush patch is a partially cured composite of reinforcing fibers oriented in the same preselected directions and a partially cured binding resin.

3. The method of claim 2, including the step of curing the flush patch in place under temperature and pressure elevated substantially above ambient temperature and pressure.

4. The method of claim 1 wherein the fixing step includes passing blind side fasteners into the backing lip from one side of the material only and wherein the backing lip extends radially at least approximately four times the diameter of the blind side fasteners.

5. The method of claim 4 including prior to the trimming step, positioning a drilling and tracing template, having an interior tracing guide defining the shape to be trimmed and a drilling guide for drilling holes for the fasteners, over the damaged area, whereafter tracing the area to be trimmed using the tracing guide, removing the template, and removing the traced area.

6. The method of claim 5 including the step of repositioning the template around the trimmed area after the inserting step.

7. The method of claim 6 including engaging a compression jig having pulling means for pulling on the grasping member, compression means for pushing against the material to be patched, and positioning means for positively repositioning the template around the trimmed area with the grasping member, the template, and the material to be patched after repositioning the template.

8. The method of claim 7, including the steps of drilling coaxial holes through the material to be patched and the backing lip using the drilling guide, and including the step of positioning and tightening said blind side fasteners in the holes.

9. The method of claim 8 wherein the fixing step includes bonding the flush patch to the material to be patched.

10. The method of claim 1 wherein the flush patch has a body portion integral with the filler portion and the backing lip.

* * * * *